J. GIBBS.

Balance.

No. 4,757.

Patented Sept. 12, 1846.

UNITED STATES PATENT OFFICE.

JOSHUA GIBBS, OF NEWARK, OHIO.

PLATFORM-BALANCE.

Specification of Letters Patent No. 4,757, dated September 12, 1846.

*To all whom it may concern:*

Be it known that I, JOSHUA GIBBS, of Newark, in the county of Licking and State of Ohio, have invented a new and useful Improvement in Balances for Weighing, and that the following is a full, clear, and exact description of the principle or character which distinguishes it from all other things before known and of the manner of making, constructing, and using the same, reference being had to the accompanying drawings, making part of this specification, in which—

Figure 1:
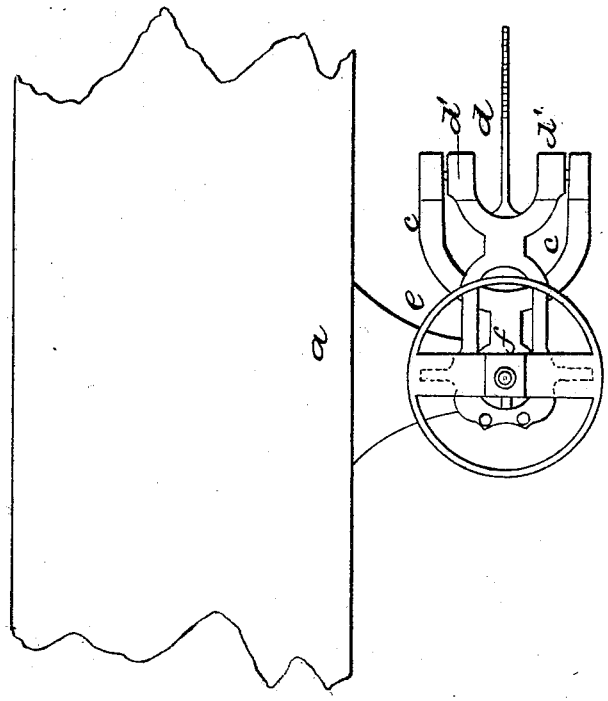
Figure 2:
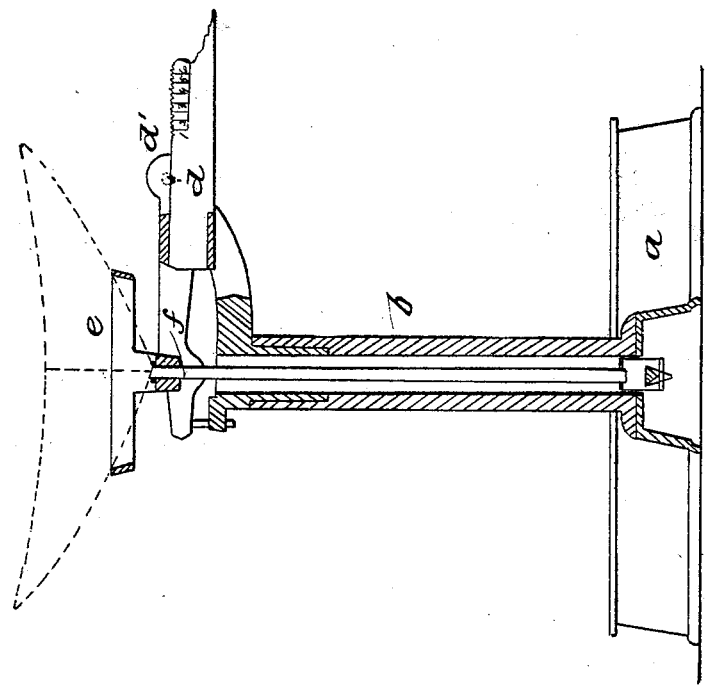

Figure 1 is a plan, and Fig. 2, a vertical section of the balance.

The same letters indicate like parts in all the figures.

The nature of my improvement consists in the manner in which I have attached the scale beam to the platform balance, so that it can be turned into any horizontal position to weigh with.

The construction is as follows: the platform and stand (*a*) are like many balances now in use, having a pillar or standard (*b*) on one side to which the scale beam is suspended; on the top of this standard there is a swivel from which two arms (*c*) project on one side curving upward a little above the standard; these arms form the fulcrum for the pivots (*d'*) of the beam (*d*) to rest in, one on each side. The short arm of the beam is bifurcated, as shown in the plan, Fig. 2, and over it a ring (*e*) is suspended on the usual knife edge journals; this ring has a strip of metal extending across from side to side in a line with its axis of suspension in the center of which a rod (*f*) comes through a hole made therein loosely so as to allow the ring to turn around with the beam and swivel on the standard; this last named ring supports a dish for weighing light articles, and the rod is connected with the usual cross levers below. By this form of construction it will be perceived that the beam can be placed in any horizontal position and will weigh with the same accuracy either light articles above, or heavy ones on the platform below.

What I claim as my invention and desire to secure by Letters Patent is—

Combining the scale beam with the platform balance, in the manner described, so as to be turned into any horizontal position, the whole being constructed as herein set forth.

JOSHUA GIBBS.

Witnesses:
HENRY WILSON,
SAMUEL H. BANCROFT.